US007429876B1

(12) United States Patent
Chung

(10) Patent No.: US 7,429,876 B1
(45) Date of Patent: Sep. 30, 2008

(54) DIFFERENTIAL SIGNAL TRANSMISSION SYSTEM

(75) Inventor: Chun-Fan Chung, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 0 days.

(21) Appl. No.: 11/863,237

(22) Filed: Sep. 27, 2007

(30) Foreign Application Priority Data

Jul. 16, 2007 (TW) .............................. 96125851 A

(51) Int. Cl.
*H03K 19/0175* (2006.01)

(52) U.S. Cl. .......................................... 326/82; 327/71

(58) Field of Classification Search .................. 326/82; 327/71
See application file for complete search history.

(56) References Cited

U.S. PATENT DOCUMENTS 5,847,592 A * 12/1998 Gleim et al. ................ 327/403
5,933,458 A * 8/1999 Leurent et al. .............. 375/317
6,181,740 B1 * 1/2001 Yasuda ....................... 375/232
6,226,330 B1 * 5/2001 Mansur ...................... 375/257
6,452,420 B1 * 9/2002 Wong .......................... 326/86
6,686,863 B1 * 2/2004 Jaussi et al. ................. 341/158
6,823,024 B2 * 11/2004 Wagner ...................... 375/319
7,142,612 B2 * 11/2006 Horowitz et al. ............ 375/286
7,167,523 B2 * 1/2007 Mansur ...................... 375/242
7,233,274 B1 * 6/2007 Kuhn ......................... 341/161
2003/0117271 A1 * 6/2003 Barre et al. ................ 340/14.1
2005/0132087 A1 * 6/2005 Glinski et al. ............... 709/238

* cited by examiner

*Primary Examiner*—James H. Cho
*Assistant Examiner*—Jason Crawford
(74) *Attorney, Agent, or Firm*—Winston Hsu

(57) ABSTRACT

A differential signal transmission system includes m different voltage/current supplies, n transmission end, and a controller. The controller includes m×n switches. Each of the switches is coupled between a voltage/current supply and a transmission end. The controller controls the switches to turn on or off for coupling each transmission end to one of the different voltage/current supplies so as to carry the voltage of the coupled voltage supply onto the transmission end according to the transmitting data. The sum of the voltage differences among the transmission ends is 0.

7 Claims, 7 Drawing Sheets

Data (1,2,3,4,5,6)
210
200
(+1) $V_1$ (0) $V_2$ (−1) $V_3$
$S_{1A}$ $S_{2A}$ $S_{3A}$ $S_{1B}$ $S_{2B}$ $S_{3B}$ $S_{1C}$ $S_{2C}$ $S_{3C}$
Transmission line
$V_A$ $V_B$ $V_C$
A B C
221 222 223 230
Data (1,2,3,4,5,6)
Transmission end
Receiving end

| Transmitting data | The switches on geing truned | $V_A$ | $V_B$ | $V_C$ | $V_D$ | Result of the comparator 521(A-B) | Result of the comparator 522(A-C) | Result of the comparator 523(A-D) | Result of the comparator 524(B-C) | Result of the comparator 525(B-D) | Result of the comparator 526(C-D) | The data decoded |
|---|---|---|---|---|---|---|---|---|---|---|---|---|
| 1 | $S_{1A}$,$S_{2B}$,$S_{3C}$,$S_{4D}$ | +2 | +1 | −1 | −2 | 1 | 1 | 1 | 1 | 1 | 1 | 1 |
| 2 | $S_{1A}$,$S_{2B}$,$S_{4C}$,$S_{3D}$ | +2 | +1 | −2 | −1 | 1 | 1 | 1 | 1 | 1 | 0 | 2 |
| 3 | $S_{1A}$,$S_{3B}$,$S_{2C}$,$S_{4D}$ | +2 | −1 | +1 | −2 | 1 | 1 | 1 | 0 | 1 | 1 | 3 |
| 4 | $S_{1A}$,$S_{3B}$,$S_{4C}$,$S_{2D}$ | +2 | −1 | −2 | +1 | 1 | 1 | 1 | 1 | 0 | 0 | 4 |
| 5 | $S_{1A}$,$S_{4B}$,$S_{2C}$,$S_{3D}$ | +2 | −2 | +1 | −1 | 1 | 1 | 1 | 0 | 0 | 1 | 5 |
| 6 | $S_{1A}$,$S_{4B}$,$S_{3C}$,$S_{2D}$ | +2 | −2 | −1 | +1 | 1 | 1 | 1 | 0 | 0 | 0 | 6 |
| 7 | $S_{2A}$,$S_{1B}$,$S_{3C}$,$S_{4D}$ | +1 | +2 | −1 | −2 | 0 | 1 | 1 | 1 | 1 | 1 | 7 |
| 8 | $S_{2A}$,$S_{1B}$,$S_{4C}$,$S_{3D}$ | +1 | +2 | −2 | −1 | 0 | 1 | 1 | 1 | 1 | 0 | 8 |
| 9 | $S_{2A}$,$S_{3B}$,$S_{1C}$,$S_{4D}$ | +1 | −1 | +2 | −2 | 1 | 0 | 1 | 0 | 1 | 1 | 9 |
| 10 | $S_{2A}$,$S_{3B}$,$S_{4C}$,$S_{1D}$ | +1 | −1 | −2 | +2 | 1 | 1 | 0 | 1 | 0 | 0 | 10 |
| 11 | $S_{2A}$,$S_{4D}$,$S_{1C}$,$S_{3D}$ | +1 | −2 | +2 | −1 | 1 | 0 | 1 | 0 | 0 | 1 | 11 |
| 12 | $S_{2A}$,$S_{4B}$,$S_{3C}$,$S_{1D}$ | +1 | −2 | −1 | +2 | 1 | 1 | 0 | 0 | 0 | 0 | 12 |
| 13 | $S_{3A}$,$S_{1B}$,$S_{2C}$,$S_{4D}$ | −1 | +2 | +1 | −2 | 0 | 0 | 1 | 1 | 1 | 1 | 13 |
| 14 | $S_{3A}$,$S_{1B}$,$S_{4C}$,$S_{2D}$ | −1 | +2 | −2 | +1 | 0 | 1 | 0 | 1 | 1 | 0 | 14 |
| 15 | $S_{3A}$,$S_{2B}$,$S_{1C}$,$S_{4D}$ | −1 | +1 | +2 | −2 | 0 | 0 | 1 | 0 | 1 | 1 | 15 |
| 16 | $S_{3A}$,$S_{2B}$,$S_{4C}$,$S_{1D}$ | −1 | +1 | −2 | +2 | 0 | 1 | 0 | 1 | 0 | 0 | 16 |
| 17 | $S_{3A}$,$S_{4B}$,$S_{1C}$,$S_{2D}$ | −1 | −2 | +2 | +1 | 1 | 0 | 0 | 0 | 0 | 1 | 17 |
| 18 | $S_{3A}$,$S_{4B}$,$S_{2C}$,$S_{1D}$ | −1 | −2 | +1 | +2 | 1 | 0 | 0 | 0 | 0 | 0 | 18 |
| 19 | $S_{4A}$,$S_{1B}$,$S_{2C}$,$S_{3D}$ | −2 | +2 | +1 | −1 | 0 | 0 | 0 | 1 | 1 | 1 | 19 |
| 20 | $S_{4A}$,$S_{1B}$,$S_{3C}$,$S_{2D}$ | −2 | +2 | −1 | +1 | 0 | 0 | 0 | 1 | 1 | 0 | 20 |
| 21 | $S_{4A}$,$S_{2B}$,$S_{1C}$,$S_{3D}$ | −2 | +1 | +2 | −1 | 0 | 0 | 0 | 0 | 1 | 1 | 21 |
| 22 | $S_{4A}$,$S_{2B}$,$S_{3C}$,$S_{1D}$ | −2 | +1 | −1 | +2 | 0 | 0 | 0 | 1 | 0 | 0 | 22 |
| 23 | $S_{4A}$,$S_{3B}$,$S_{1C}$,$S_{2D}$ | −2 | −1 | +2 | +1 | 0 | 0 | 0 | 0 | 0 | 1 | 23 |
| 24 | $S_{4A}$,$S_{3B}$,$S_{2C}$,$S_{1D}$ | −2 | −1 | +1 | +2 | 0 | 0 | 0 | 0 | 0 | 0 | 24 |

Fig. 7

DIFFERENTIAL SIGNAL TRANSMISSION SYSTEM

BACKGROUND OF THE INVENTION

1. Field of the Invention

The present invention relates to a transmission system of differential signals, and more particularly, to a transmission system of a differential signal group.

2. Description of the Prior Art

FIG. 1 is a diagram illustrating a conventional differential signal transmission system 100. The transmission end of the conventional differential signal transmission system 100 comprises a transmission device 110 for transmitting a pair of voltage signals according to the transmitting data (one bit, 0 or 1) through the transmission line pair to the comparator 120 of the receiving end. The comparator 120 compares the voltages of the input ends A and B for generating the received data (0 or 1). For example, when data "0" is transmitted, the transmission device 110 transmits −5 volts on the transmission line A, and +5 volts on the transmission line B. Thus, the comparator 120 compares the voltages on the transmission lines A and B ($V_A<V_B$) and outputs data "0". In this way, the differential transmission is completed. The reason for the conventional transmission system 100 utilizing differential signals is that the differential signals of the same pair have the same common-mode noises and therefore the differential signals of the same pair possess better capability of resisting noises. And because in the differential signal pair, a voltage change in one differential signal has the same amplitude as a voltage change in the other differential signal (and inversed), the electromagnetic interference (EMI) generated by the voltage changes can be reduced. However, in the conventional transmission system 100, a pair of transmission lines only transmits one bit at one time. Therefore, when the data transmission bandwidth requirement becomes substantially large, much more pairs of transmission lines are needed, which costs space and expense.

SUMMARY OF THE INVENTION

The present invention provides a differential signal transmission system for transmitting data. The differential signal transmission system comprises m different reference signal supplies, n transmission ends, and a controller, where m and n are positive integers. The controller includes (m×n) switches. Each switch is coupled between one of the m reference signal supplies and one of the n transmission ends. The controller controls the (m×n) switches for coupling each of the n transmission ends to one of the m reference signal supplies so as to enable each of the n transmission ends to carry a corresponding reference signal according to the data. A sum of signal differences among the n transmission ends is 0, and $m \geqq n$, and $n \geqq 3$.

These and other objectives of the present invention will no doubt become apparent to those of ordinary skill in the art after reading the following detailed description of the preferred embodiment that is illustrated in the various figures and drawings.

BRIEF DESCRIPTION OF THE DRAWINGS

FIG. 7 is a table illustrating the operation of FIG. 5.

DETAILED DESCRIPTION

Figure 1:
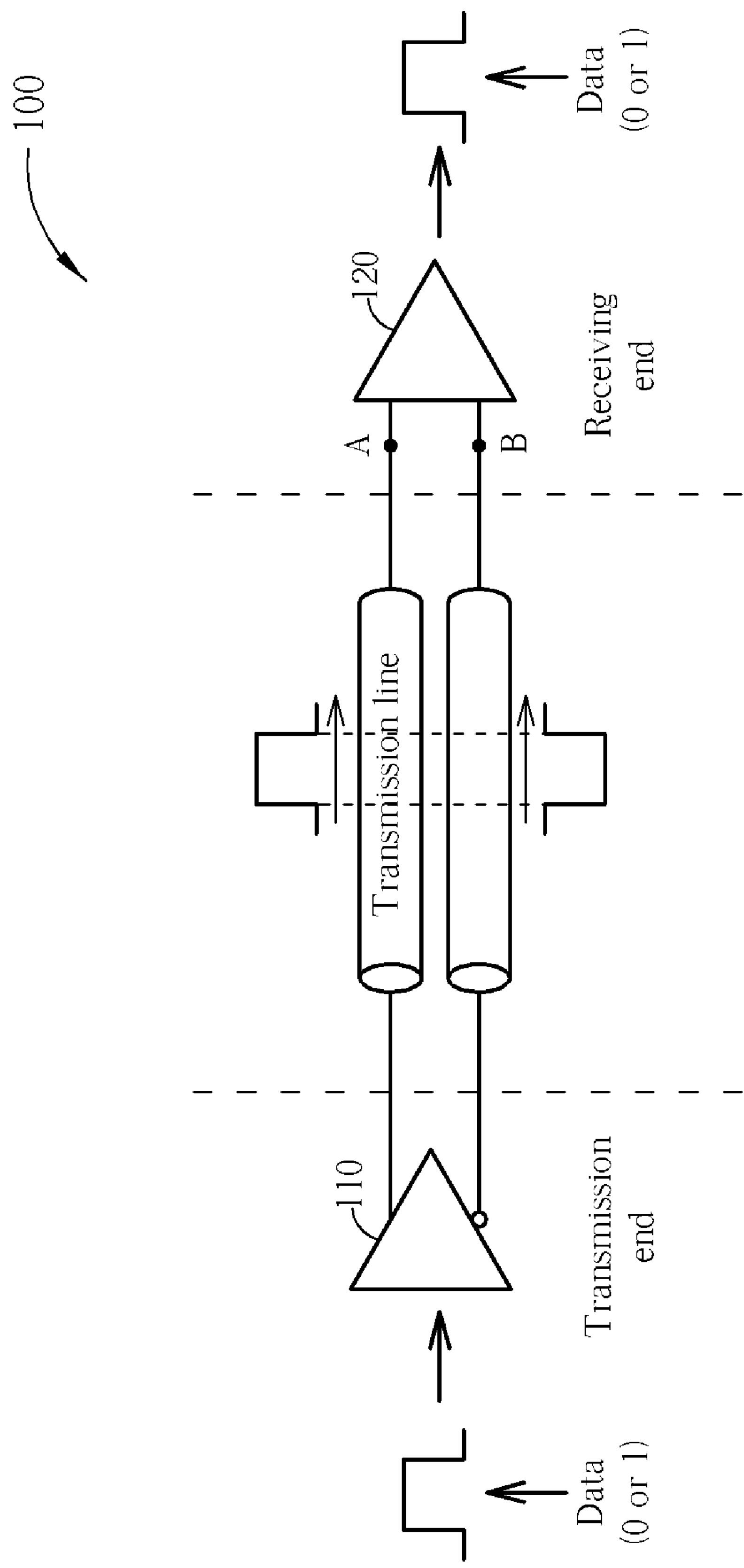
FIG. 1 is a diagram illustrating a conventional differential signal transmission system.
Figure 2:
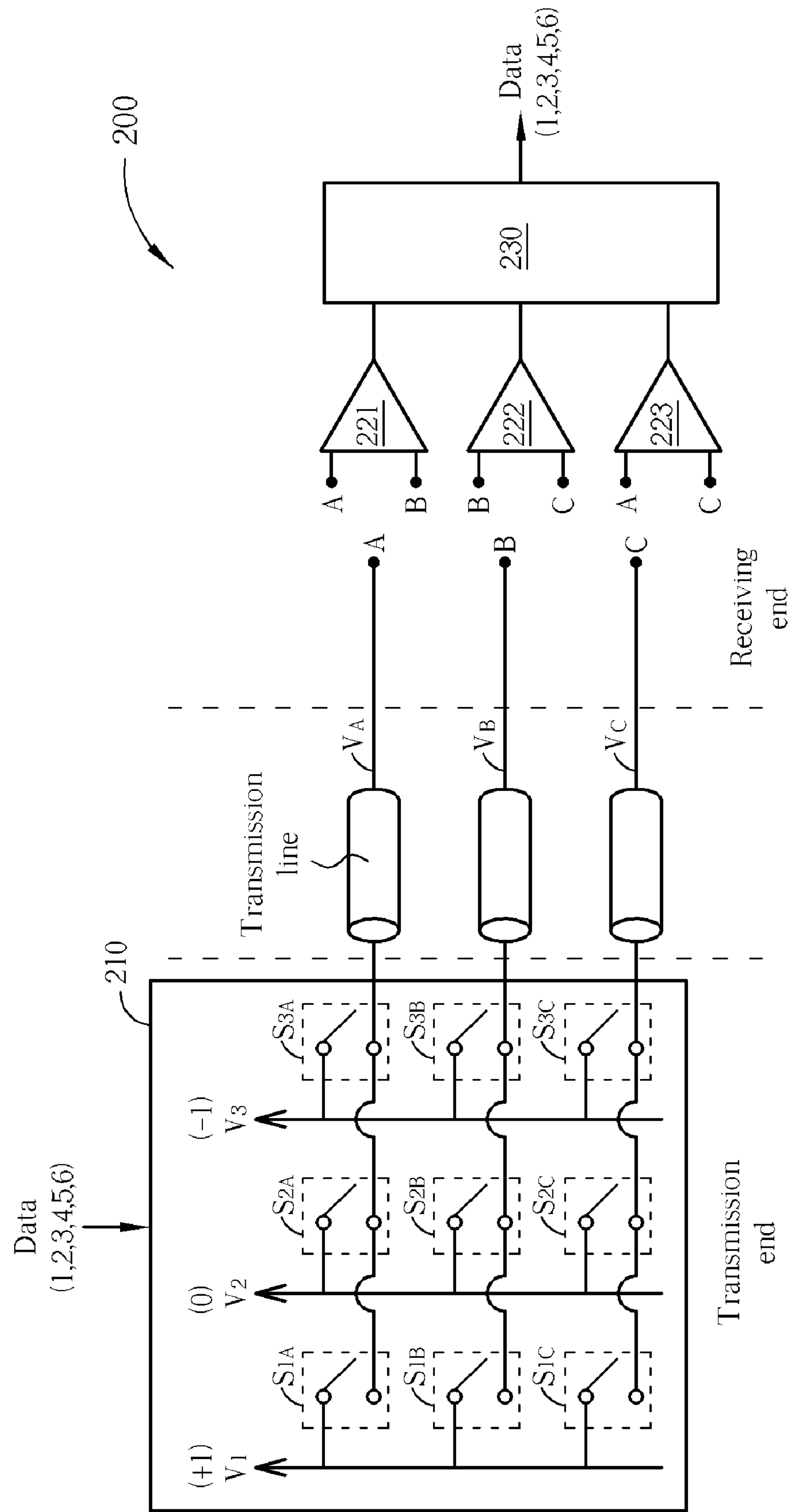
FIG. 2 is a diagram illustrating a differential signal transmission system according to a first embodiment of the present invention.

FIG. 2 is a diagram illustrating a differential signal transmission system 200 according to a first embodiment of the present invention. As shown in FIG. 2, the transmission system 200 utilizes three transmission lines A, B, and C for transmission. The transmission end of the transmission system 200 comprises a controller 210, three different reference signal supplies $V_1$, $V_2$, and $V_3$, and nine switches $S_{1A}$, $S_{2A}$, $S_{3A}$, $S_{1B}$, $S_{2B}$, $S_{3B}$, $S_{1C}$, $S_{2C}$, and $S_{3C}$. In the transmission system 200, the reference signal supplies V1, V2, and V3 are realized with three difference voltage supplies. The controller 210 controls the switches $S_{1A}$, $S_{2A}$, $S_{3A}$, $S_{1B}$, $S_{2B}$, $S_{3B}$, $S_{1C}$, $S_{2C}$, and $S_{3C}$ to respectively turn on or off according to the transmitting data. In this way, the transmission lines A, B, and C are respectively coupled to one of the voltage supplies $V_1$, $V_2$, and $V_3$. The voltage supplies $V_1$, $V_2$, and $V_3$ can be DC or AC signals. Consequently, the transmission lines A, B, and C respectively carry voltage $V_A$, $V_B$, and $V_C$ to the receiving end of the transmission system 200. The receiving end of the transmission system 200 comprises 3 comparators 221, 222, and 223, and a decoder 230. The comparators 221, 222, and 223 are disposed respectively for comparing voltages $V_A$, $V_B$, and $V_C$, and accordingly generating compared results to the decoder 230. The decoder 230 decodes the received data according to the compared results of the comparators 221~223. The sum of the voltage differences among the voltages $V_A$, $V_B$, and $V_C$ is 0 ($\Delta V_{AB}+\Delta V_{BC}+\Delta V_{CA}=0$).

According to the present invention, in the transmission end of the transmission system 200, the number of voltage supplies can be greater than or equal to the number of transmission lines. And because the sum of the voltage differences among the transmission lines is 0 volts, the data transmission can be completed with better transmission quality.

Figure 3:
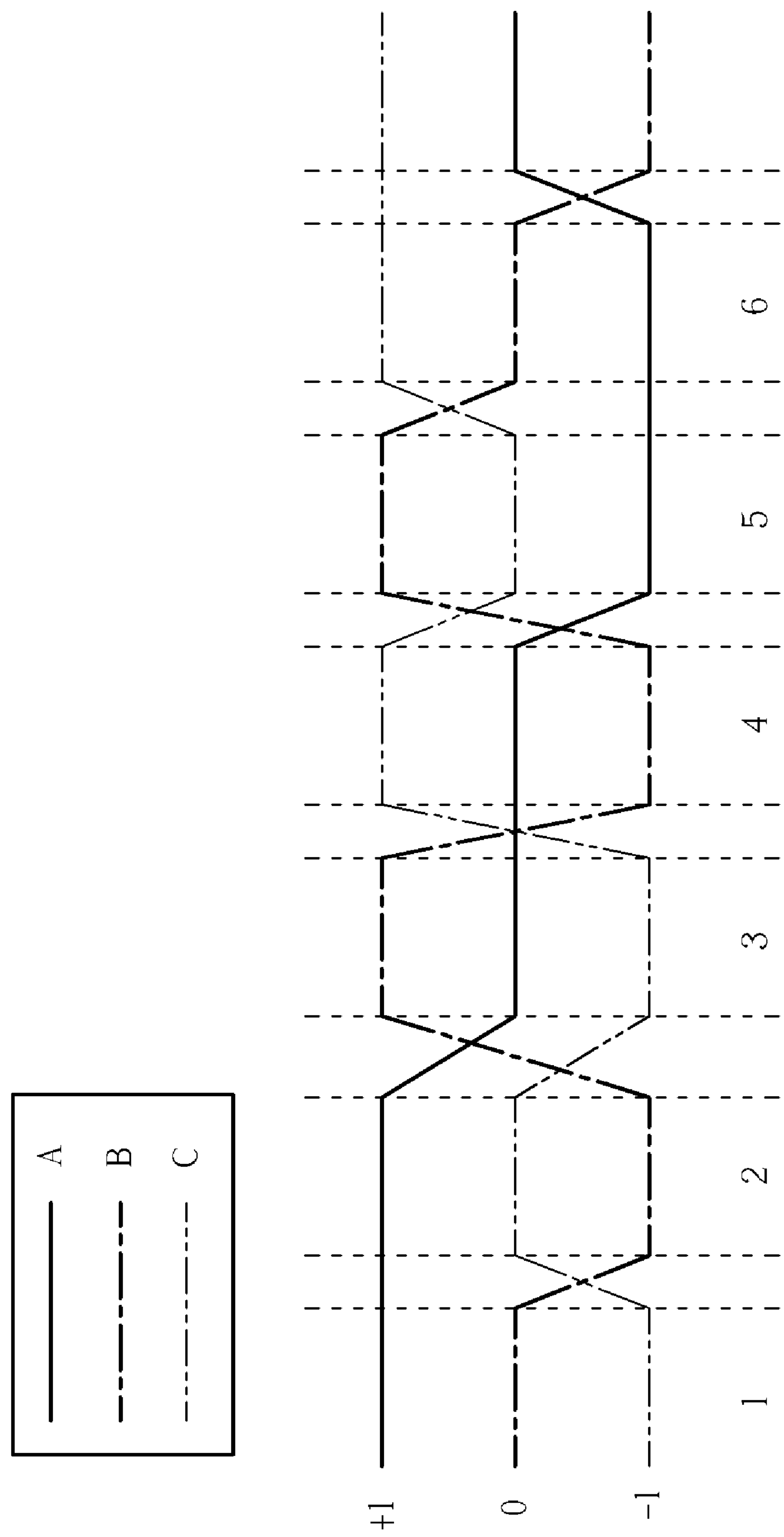
FIG. 3 is a diagram illustrating the transmission of FIG. 2.

FIG. 3 is a diagram illustrating the transmission of FIG. 2. Under the condition that the sum of the voltages of the transmission lines A, B, and C is 0 volts, the transmission system 200 can transmit 2.5 bits of data (1, 2, 3, 4, 5, and 6). It is assumed that the voltage $V_1$ is +1 volt, the voltage $V_2$ is 0 volts, and the voltage $V_3$ is −1 volt, and consequently the transmission of data 1-6 is achieved as shown in FIG. 3.

Figure 4:
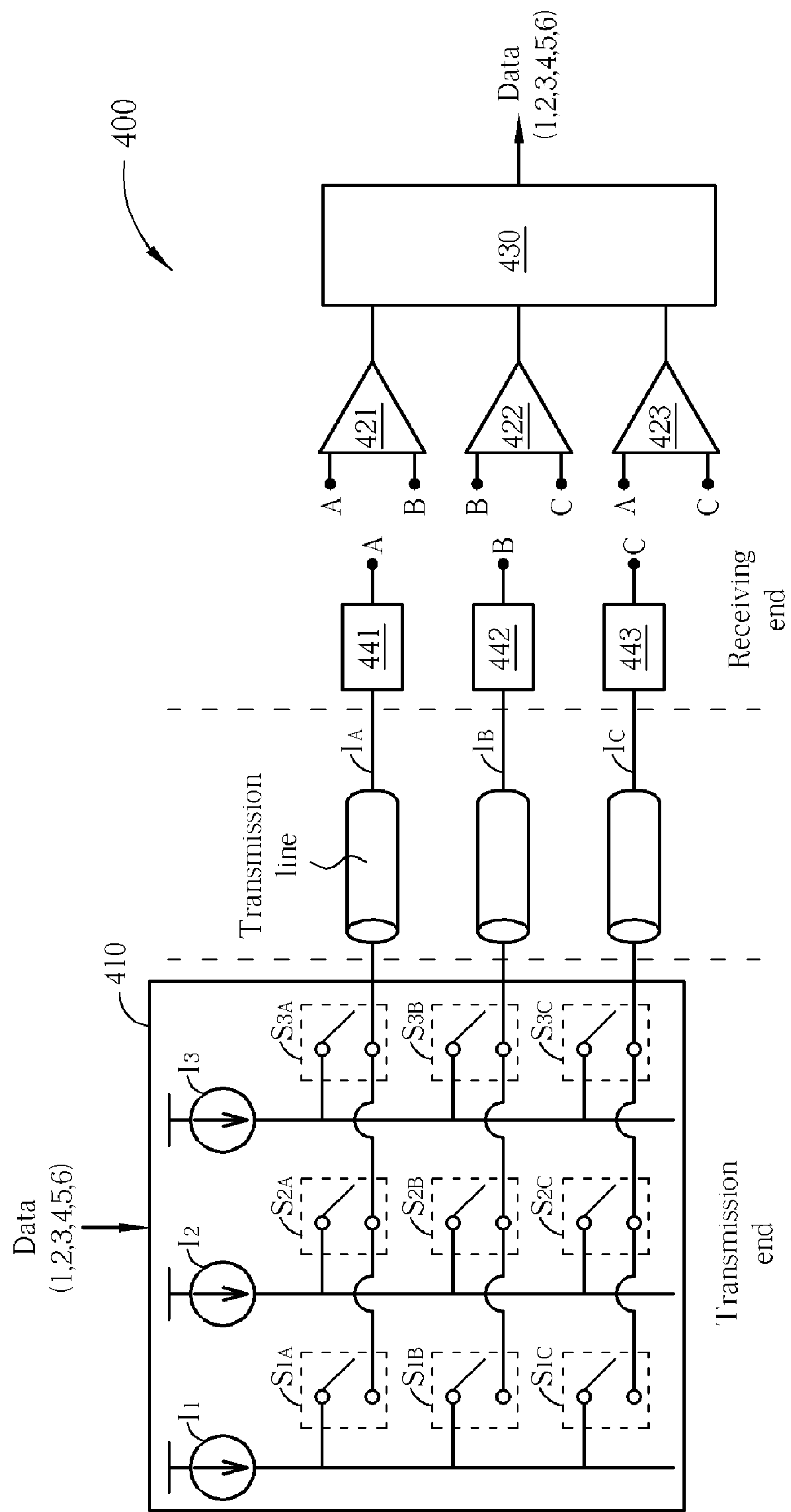
FIG. 4 is a diagram illustrating a differential signal transmission system according to a second embodiment of the present invention.

FIG. 4 is a diagram illustrating a differential signal transmission system 400 according to a second embodiment of the present invention. As shown in FIG. 4, the transmission system 400 also utilizes three transmission lines A, B, and C to transmit data, which is similar to the transmission system 200. The difference between the transmission systems 400 and 200 is that the transmission system 400 transmits data by current rather than voltage. That is, the reference signal supplies are realized with current supplies $I_1$, $I_2$, and $I_3$. Therefore, the transmission end of the transmission system 400 comprises a controller 410, three different current supplies $I_1$, $I_2$, and $I_3$, and nine switches $S_{1A}$, $S_{2A}$, $S_{3A}$, $S_{1B}$, $S_{2B}$, $S_{3B}$, $S_{1C}$, $S_{2C}$, and $S_{3C}$. The controller 410 controls the switches $S_{1A}$, $S_{2A}$, $S_{3A}$, $S_{1B}$, $S_{2B}$, $S_{3B}$, $S_{1C}$, $S_{2C}$, and $S_{3C}$ respectively to turn on or off according to the transmitting data. In this way, the transmission lines A, B, and C are respectively coupled to one of the current supplies $I_1$, $I_2$, and $I_3$. The current supplies $I_1$, $I_2$, and $I_3$ can be DC or AC signals. Consequently, the transmission lines A, B, and C respectively carry currents $I_A$, $I_B$, and $I_C$ to the receiving end of the transmission system 400. The receiving end of the transmission system 400 comprises three current/voltage converters 441, 442, and 443 for respectively converting the currents $I_A$, $I_B$, and $I_C$ into the voltages $V_A$, $V_B$, and $V_C$ besides three comparators 421, 422, and 423, and a decoder 430. The function of the comparators 421~423 and the decoder 430 is the same as that of the comparators 221-223 and the decoder 230. The sum of the current differences among the currents $I_A$, $I_B$, and $I_C$ is 0 (that is, $\Delta I_{AB}+\Delta I_{BC}+\Delta I_{CA}=0$).

According to the present invention, in the transmission end of the transmission system 400, the number of current supplies does not necessarily need to be the same as the number of transmission lines. Instead, the number of current supplies has to be greater than or equal to the number of transmission lines. As long as the sum of the current differences among the transmission lines is 0 amperes, the data transmission can be completed with improved transmission quality.

Figure 5:
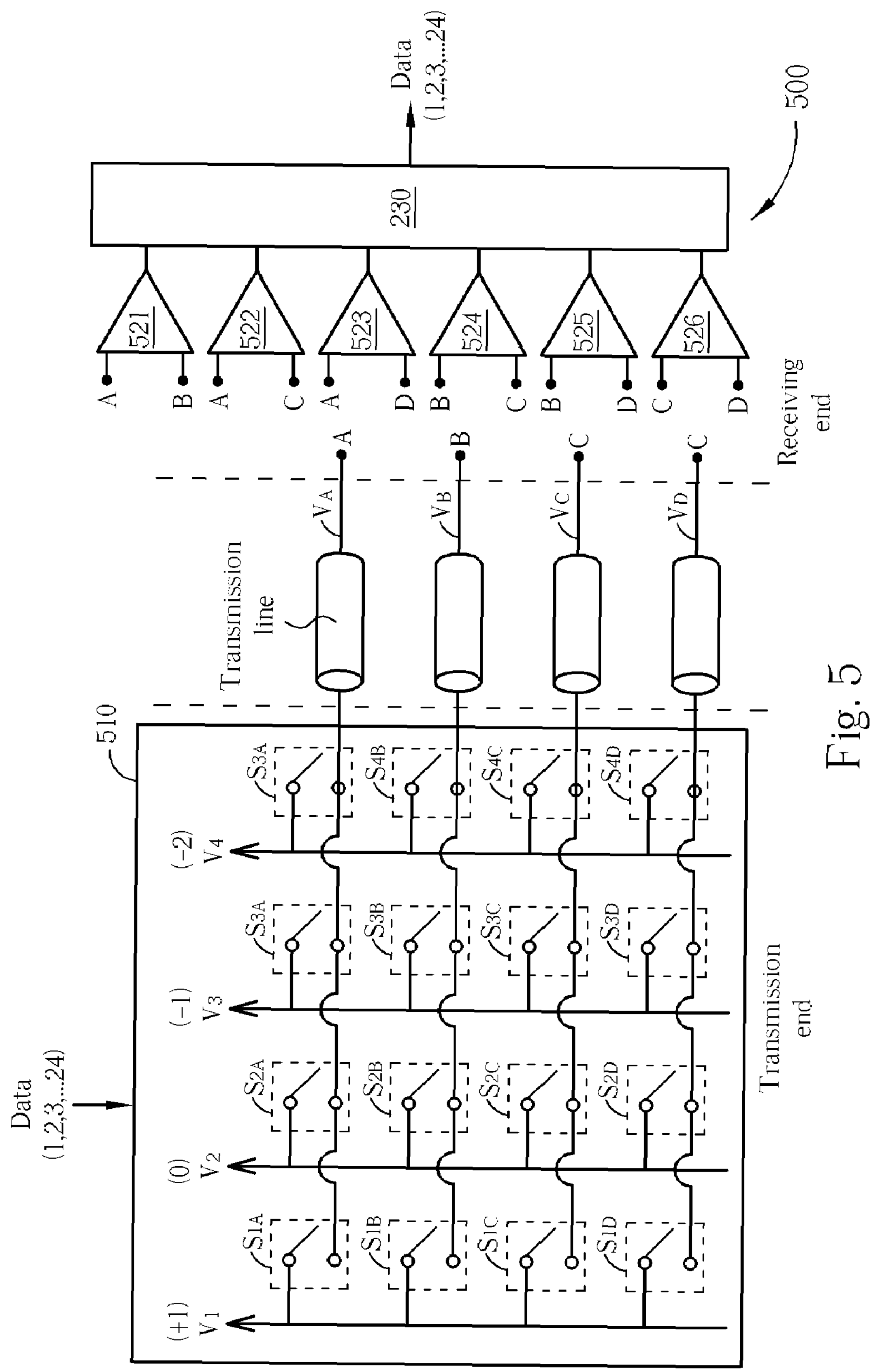
FIG. 5 is a diagram illustrating a differential signal transmission system according to a third embodiment of the present invention.

FIG. 5 is a diagram illustrating a differential signal transmission system 500 according to a third embodiment of the present invention. As shown in FIG. 5, the transmission system 500 utilizes four transmission lines A, B, C, and D for transmission. The transmission end of the transmission system 500 comprises a controller 510, four different reference signal supplies $V_1$, $V_2$, $V_3$, and $V_4$, and sixteen switches $S_{1A}$, $S_{2A}$, $S_{3A}$, $S_{4A}$, $S_{1B}$, $S_{2B}$, $S_{3B}$, $S_{4B}$, $S_{1C}$, $S_{2C}$, $S_{3C}$, $S_{4C}$, $S_{1D}$, $S_{2D}$, $S_{3D}$, and $S_{4D}$. The reference signal supplies $V_1$, $V_2$, $V_3$, and $V_4$ are realized with four different voltage supplies. The controller 510 controls the switches $S_{1A}$, $S_{2A}$, $S_{3A}$, $S_{4A}$, $S_{1B}$, $S_{2B}$, $S_{3B}$, $S_{4B}$, $S_{1C}$, $S_{2C}$, $S_{3C}$, $S_{4C}$, $S_{1D}$, $S_{2D}$, $S_{3D}$, and $S_{4D}$ to respectively turn on or off according to the transmitting data. In this way, the transmission lines A, B, C, and D are respectively coupled to one of the voltage supplies $V_1$, $V_2$, $V_3$, and $V_4$. The voltage supplies $V_1$, $V_2$, $V_3$, and $V_4$ can be DC or AC signals. Consequently, the transmission lines A, B, C, and D respectively carry voltage $V_A$, $V_B$, $V_C$, and $V_D$ to the receiving end of the transmission system 500. The receiving end of the transmission system 500 comprises 6 comparators 521, 522, 523, 524, 525, and 526, and a decoder 530. The comparators 521~526 are disposed respectively for comparing voltages $V_A$, $V_B$, $V_C$, and $V_D$, thereby generating compared results to the decoder 530. The decoder 530 decodes the received data according to the compared results of the comparators 521-523. The sum of the voltage differences among the voltages $V_A$, $V_B$, $V_C$, and $V_D$ is 0 (that is, $\Delta V_{AB}+\Delta V_{BC}+\Delta V_{CD}+\Delta V_{DA}+\Delta V_{DB}+\Delta V_{AC}=0$).

According to the present invention, in the transmission end of the transmission system 500, the number of voltage supplies has to be greater than or equal to the number of transmission lines. And because the sum of the voltage differences among the transmission lines is 0 volts, the data transmission can be completed with better transmission quality.

Figure 6:
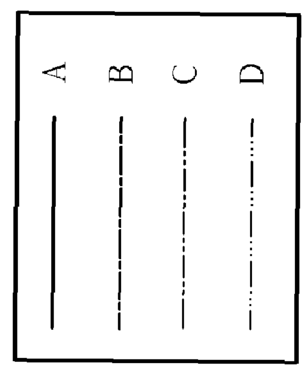
FIG. 6 is a diagram illustrating the transmission of FIG. 5.
Figure 6:
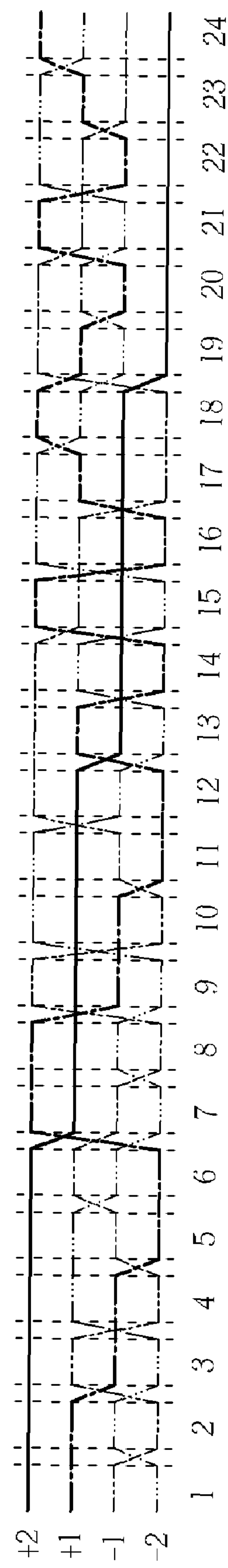

FIG. 6 is a diagram illustrating the transmission of FIG. 5. Under the condition that the sum of the voltages of the transmission lines A, B, C, and D is 0 volts, the transmission system 200 can transmit 4.5 bits of data (1-24). It is assumed that the voltage $V_1$ is +2 volts, the voltage $V_2$ is +1 volt, the voltage $V_3$ is −1 volt, and the voltage $V_4$ is −2 volts, and consequently, the transmission of data 1-24 can be achieved as shown in FIG. 5.

FIG. 7 is a table illustrating the operation of FIG. 5. As shown in FIG. 7, each transmitting data activates the controller 510 to turn on corresponding switches, and thus the voltages of the voltage supplies $V_1$-$V_4$ are respectively transmitted to the transmission lines A, B, C, and D. For example, when the data "1" is transmitted, the controller 510 turns on the switches $S_{1A}$, $S_{2B}$, $S_{3C}$, and $S_{4D}$, and turns off the rest of the switches. In this way, the voltage $V_A$ is +2 volts because the transmission line A is coupled to the voltage supply $V_1$ through the switch $S_{1A}$; the voltage $V_B$ is +1 volt because the transmission line B is coupled to the voltage supply $V_2$ through the switch $S_{2B}$; the voltage $V_C$ is −1 volt because the transmission line C is coupled to the voltage supply $V_3$ through the switch $S_{3C}$; the voltage $V_D$ is −2 volts because the transmission line D is coupled to the voltage supply $V_4$ through the switch $S_{4D}$. The sum of the voltage differences among the transmission lines A, B, C, and D is 0 (or, in other words, $\Delta V_{AB}+\Delta V_{BC}+\Delta V_{CD}+\Delta V_{DA}+\Delta V_{DB}+\Delta V_{AC}=1+2+1+(-4)+(-3)+3=0$). The voltage $V_A$ is higher than $V_B$ (+2>+1), and thus the comparator 521 outputs a result of "1"; the voltage $V_A$ is higher than $V_C$ (+2>−1), and thus the comparator 522 outputs a result of "1"; voltage $V_A$ is higher than $V_D$ (+2>−2), and thus the comparator 523 outputs a result of "1"; the voltage $V_B$ is higher than $V_C$ (+1>−1), and thus the comparator 524 outputs a result of "1"; the voltage $V_B$ is higher than $V_D$ (+1>−2), and thus the comparator 525 outputs a result of "1"; the voltage $V_C$ is higher than $V_D$ (−1>−2), and thus the comparator 526 outputs a result of "1". The decoder 530 receives the results "1", "1", "1", "1", "1", and "1" respectively of the comparators 521-526 and consequently determines the received data is "1". In this way, the data transmission of the differential signal transmission system 500 is completed.

Therefore, in the embodiments discussed above, the transmission system with three transmission lines transmits data 1-6, and the transmission system with four transmission lines transmits data 1-24. Similarly, the transmission system with five transmission lines can transmit data 1-120, which consequently raises the data transmission rate.

Those skilled in the art will readily observe that numerous modifications and alterations of the device and method may be made.

What is claimed is:

1. A differential signal transmission system for transmitting data, comprising:

m different reference signal supplies;

n transmission ends; and a controller comprising (m×n) switches, each switch being coupled between one of the m reference signal supplies and one of the n transmission ends, the controller is adapted to control the (m×n) switches for coupling each of the n transmission ends to one of the m reference signal supplies so as to enable each of the n transmission ends to carry a corresponding reference signal according to the data;

wherein a sum of signal differences among the n transmission ends is 0; and wherein $m \geqq n$, and $n \geqq 3$.

2. The differential signal transmission system of claim 1, wherein the m different reference signal supplies are m different reference voltage supplies.

3. The differential signal transmission system of claim 1, wherein the m different reference signal supplies are m different reference current supplies.

4. The differential signal transmission system of claim 1, further comprising:

n receiving ends, each of the n receiving ends being coupled to a corresponding transmission end of the n transmission ends for receiving the corresponding reference signal;

a plurality of comparators, each of the comparators comprising two input ends, coupled to any two receiving ends of the n receiving ends, for comparing reference signals of the coupled receiving ends and generating a comparing result; and a decoder for receiving the comparing results of the plurality of comparators and accordingly generating the data.

5. The differential signal transmission system of claim 4, wherein the reference signals received by the n receiving ends are voltage signals.

6. The differential signal transmission system of claim 4, wherein the reference signals received by the n receiving ends are current signals.

7. The differential signal transmission system of claim 6, further comprising a plurality of current/voltage converters, each of the current/voltage converters being coupled to a corresponding input end of the plurality of the comparators.

* * * * *